Figure 1:
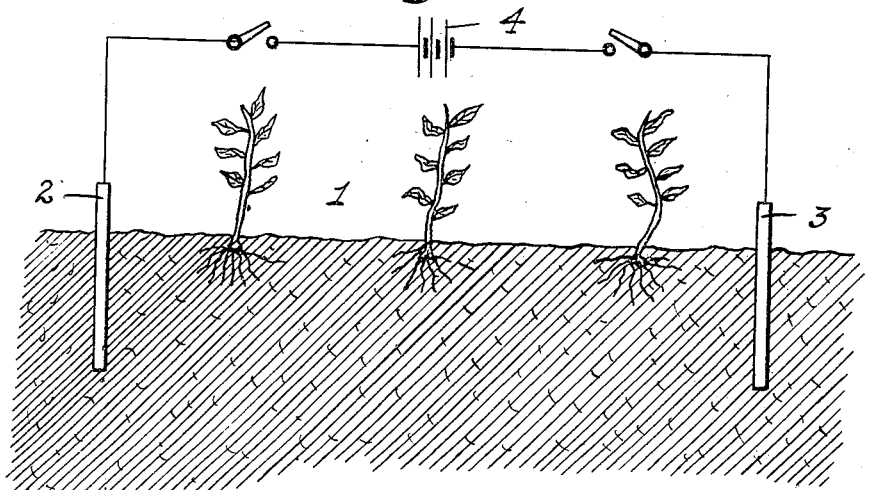

I. KITSEE.
DESTROYING INSECTS HARMFUL TO PLANT LIFE.
APPLICATION FILED DEC. 12, 1914.

1,172,367.

Patented Feb. 22, 1916.

Witnesses
Alvah Rittenhouse
Edith R. Stilley

Inventor
Isidor Kitsee

UNITED STATES PATENT OFFICE.

ISIDOR KITSEE, OF PHILADELPHIA, PENNSYLVANIA.

DESTROYING INSECTS HARMFUL TO PLANT LIFE.

1,172,367.   Specification of Letters Patent.   Patented Feb. 22, 1916.

Application filed December 12, 1914. Serial No. 876,848.

*To all whom it may concern:*

Be it known that I, ISIDOR KITSEE, citizen of the United States, residing at Philadelphia, in the county of Philadelphia and State of Pennsylvania, have invented certain new and useful Improvements in Destroying Insects Harmful to Plant Life, of which the following is a specification.

My invention relates to an improvement in destroying insects harmful to plant life.

The method of destruction of such insects as carried out to-day may be divided into two large classes:—(*a*) The destruction of insects with the aid of chemicals placed in the soil around the plant to be protected, as for instance, the treatment of grape vines with the aid of bi-sulfid of carbon poured into the holes made in the soil around the roots of the plant. (*b*) The spraying of the plant itself with the aid of an insecticide solution, such as arsenites, or the treatment of the plant with gases such as hydrocyanid. Each of these methods has its drawbacks.

It is the aim of my invention to eliminate the disadvantages of the systems of to-day and produce means whereby the obnoxious insects as well as their larvæ and eggs may be destroyed at a comparatively small cost and with comparative simple means.

The underlying principle of my invention consists in the generation of the insecticide, preferably in the form of a free gas or a gas dissolved in a solution with the aid of an electric current, and applying gas or gas containing solution in a nascent state to the soil or plant infested with the insects, their larvæ or eggs.

My invention may be practised either by freeing the soil from obnoxious insects or by freeing the plant from same, and I will give a few examples whereby a person versed in the art may practice my invention.

1. If it is required to purify a comparatively small area of the soil in which the plant grows, then the soil is impregnated with the solution carrying an insecticide element and this solution is then electrolyzed with the aid of an electric current by simply inserting electrodes around the area to be purified and connecting the electrodes to a current carrying circuit. If the area to be purified is comparatively large, then it is preferred that trenches be dug on at least two sides of the area and filled with the solution to be electrolyzed. It is also to be preferred if possible to impregnate the whole area with the solution. Large conductors are then placed in the trenches and connected to a current carrying circuit.

2. When the plant itself, such as a tree, in an orchard has to be treated, then the solution carrying the element adapted to destroy the insects is made the electrolyte in an electric apparatus and the plant then sprayed with the solution after decomposition has taken place through the action of the electric current.

A very simple and economic means of accomplishing this object is the following:— On a vehicle is placed a tank suitable to be converted into an electrolytic apparatus by filling the same with the required electrolyte and immersing therein two electrodes, an anode and a cathode. If preferred, the tank may be divided into two compartments. The motive power of said vehicle, if self-driven, is coupled to a generator such as a dynamo and to the leads of the dynamo are connected the two electrodes. The vehicle is moved to the required tree, and if an auto-truck is used, the dynamo is uncoupled when moving about and is then placed in action and currents of electricity are sent through the electrolytic apparatus thereby electrolyzing the solution and freeing the element adapted to destroy the insect either in the form of a gas or in the form of a gas bearing solution.

Different materials may be used for the purpose indicated and I will here only enumerate a few chemical compounds well adapted to electrolyzing and generating through electrolyzation the germicide gases:—common salt, chlorid of sodium, (NaCl.) If salt is used, then through the electrolytic action chlorin is generated in the positive compartment or in the region of the positive electrode, and this chlorin, either in its gaseous state or dissolved in a liquid is one of the best insecticides not only for the spraying of the plant itself but also for the purpose of purifying the soil in which the root is growing.

In making use of the electrolyte either the contents of positive compartment alone may be used or the same may be mixed with the contents of the negative compartment which then contains a hydrated oxid of sodium. Ammonium compounds are well adapted for the purpose in question as they not only act as an insecticide after electrolyzation but also enrich the soil and act substantially as a fertilizer. Of these compounds the cheap carbonate of ammonium, chlorid of ammonium, nitrate of ammonium, as well as any of the sulfates may be used for the reason that the free ammonia ($NH_3$) is a germicide in itself and yet will act, when combined with moisture of the soil, as an enricher of same.

It was found that in selecting the compounds to be electrolyzed it is best to select such compounds as will give in the negative compartment a strong alkaline reaction.

It is impossible to give a strict rule as to the character and strength of the electrolyte when used as the nature of the plant, the nature of the soil, and the species of the insects has to be taken into consideration. In some cases where the nature of the plant or the nature of the seed does not allow the application of an alkaline solution, the soil may be impregnated with salts of metals, such even as a salt of iron or copper, and the compound then electrolyzed. In all cases it is best to apply the electrolyzation either in the early spring or the late fall. Persons versed in the art will readily find the exact time and exact compound necessary for each particular case.

In a great many cases where the electrolysis is applied to the soil it is best to apply thereto two separate operations and in the second operation the current should be reversed and the electrode formerly used as anode should be made the cathode and vice versa. This second operation may be made after the soil is again saturated with a fresh solution. This second operation is necessary in some localities as otherwise a great part of the area treated would only receive the catholyte.

With this my invention, if the same is carefully carried out, the most obnoxious insects, such as weevils in cotton fields, or scales on fruit trees, can be successfully destroyed. The only caution that is necessary is to so adjust the strength of the electrolyte that the root of the plant shall not be injured if the insects are to be treated in the soil.

To illustrate some forms my invention may take I have recourse to the accompanying drawing, in which—

Figure 2:
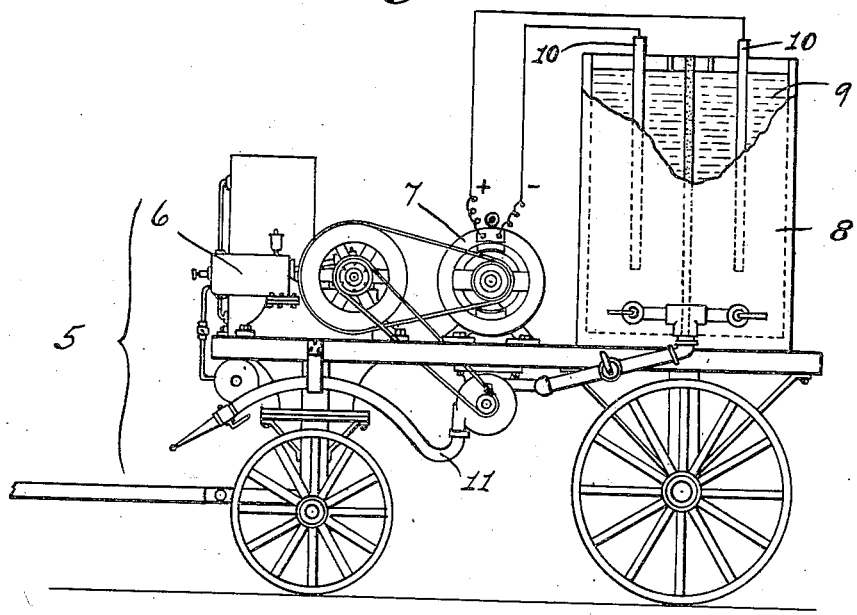

Figure 1 is a partial sectional and partial diagrammatic view and Fig. 2 is a partial side elevation and partial diagrammatic view embodying my invention in different forms.

In Fig. 1, the soil or ground is indicated by the numeral 1. The soil is supposed to be impregnated with the solution containing the insecticide in chemical combination. 2 and 3 are the electrodes; 4 the source of electric current, here shown as a battery, connected with the interposition of switches to the electrodes.

In Fig. 2 the truck is indicated by the numeral 5, the motive power by 6, the generator of electricity or dynamo by 7, the electrolytic apparatus by 8, the electrolyte by 9, the electrodes by 10 and the means to carry the electrolyte to the desired point by 11.

I may state here that the process as outlined for the soil is also very efficient for the destruction of the eggs or larvæ of the mosquito or alike insects. In this case a quantity of salt is added to the pool wherein the eggs or larvæ abound and then electric current is applied for the purpose of electrolyzing the salt, if such is used.

Having now described my invention what I claim as new and desire to secure by Letters Patent is:—

1. In the purifying of the soil from insects harmful to vegetable life, the method which consists in providing the soil with a compound carrying in combination a germicide element, electrolyzing said compound while in said soil, thereby freeing said element and causing through said element the destruction of obnoxious insects.

2. The method of destroying obnoxious insects their larvæ or eggs infesting the soil, which consists in impregnating the soil with a solution carrying an insecticide in a dormant state, electrolyzing the solution during the time that the same is in said soil thereby freeing the insecticide and making the same available for the destruction of said insects.

3. In the destruction of insects obnoxious to plant life, the improvement which consists in electrolyzing required compounds in the soil carrying the plants and causing, through the gases freed during the electrolytic action, the destruction of the insects infesting said soil.

4. The method of destroying the larvæ or eggs of obnoxious insects which consists in providing the area inhabited by said larvæ or eggs with a compound carrying in chemical combination an insecticide element and electrolyzing said compound, thereby freeing said insecticide element.

In testimony whereof I affix my signature in presence of two witnesses.

ISIDOR KITSEE.

Witnesses:
EDITH R. STILLEY,
H. C. YETTER.